US006955389B2

(12) United States Patent
Suzuki et al.

(10) Patent No.: US 6,955,389 B2
(45) Date of Patent: Oct. 18, 2005

(54) VEHICLE DOOR CONTROLLING APPARATUS

(75) Inventors: Shintaro Suzuki, Kasugai (JP); Tomoaki Imaizumi, Hoi-gun (JP); Eiji Itami, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/829,445

(22) Filed: Apr. 22, 2004

(65) Prior Publication Data

US 2004/0262945 A1 Dec. 30, 2004

(30) Foreign Application Priority Data

Apr. 22, 2003 (JP) ............................ 2003-117215

(51) Int. Cl.[7] .............................. B60J 5/06; B60J 5/00

(52) U.S. Cl. .................... 296/146.4; 296/155; 49/503; 292/201

(58) Field of Search ............................ 296/146.1, 155, 296/146.4; 49/503; 292/201; 70/DIG. 65, 70/264

(56) References Cited

U.S. PATENT DOCUMENTS

| | | | | | |
|---|---|---|---|---|---|
| 4,506,911 | A | * | 3/1985 | Nakamura et al. | 280/801.1 |
| 4,544,198 | A | * | 10/1985 | Ochiai et al. | 296/155 |
| 4,561,690 | A | * | 12/1985 | Shinjo et al. | 296/155 |
| 5,398,988 | A | * | 3/1995 | DeRees et al. | 296/155 |
| 5,676,416 | A | * | 10/1997 | Cooper | 296/97.22 |
| 5,769,481 | A | * | 6/1998 | Cooper | 296/97.22 |
| 5,777,546 | A | * | 7/1998 | Dean et al. | 340/438 |
| 5,836,639 | A | * | 11/1998 | Kleefeldt et al. | 296/155 |
| 6,007,141 | A | * | 12/1999 | Thomas et al. | 296/155 |
| 6,231,113 | B1 | * | 5/2001 | Armbruster et al. | 296/155 |
| 6,382,705 | B1 | * | 5/2002 | Lang et al. | 296/146.12 |
| 6,616,214 | B2 | * | 9/2003 | Wattebled | 296/146.1 |
| 2003/0111863 | A1 | * | 6/2003 | Weyerstall et al. | 296/146.1 |

FOREIGN PATENT DOCUMENTS

| | | |
|---|---|---|
| JP | 2002-147090 A | 5/2002 |

* cited by examiner

*Primary Examiner*—Patricia L. Engle
(74) *Attorney, Agent, or Firm*—Buchanan Ingersoll PC

(57) ABSTRACT

A vehicle door controlling apparatus comprises a connection locking mechanism between a swinging door and a sliding door for locking the two doors by connecting them to each other. The swinging door is capable of opening or closing the front side of a vehicle opening and the second door is capable of opening or closing the rear side of the opening. The vehicle door controlling apparatus further comprises an operating switch which requests the opening of the sliding door, a rotary switch which detects a lock state between the doors, and a latch switch and a pole switch which detect a lock state at the rear side of the sliding door. When the controller detects a request for opening the sliding door, a release actuator releases the lock state, electric current is applied to a sliding motor, and electrical operation of the sliding door starts.

18 Claims, 10 Drawing Sheets

VEHICLE DOOR CONTROLLING APPARATUS

CROSS-REFERENCE TO RELATED APPLICATIONS

This application is based on and claims priority under 35 U.S.C. §119 with respect to Japanese Application No. 2003-117215 filed on Apr. 22 2003, the entire contents of which are incorporated herein by reference.

BACKGROUND OF THE INVENTIONS

1. Field of the Inventions

The present invention relates to a vehicle door controlling apparatus that electrically operates vehicle doors to perform opening/closing thereof, and more specifically, for a center pillar-less vehicle, to an apparatus for controlling a sliding door, which includes a swinging door for performing opening/closing thereof in the widthwise direction of the vehicle and a sliding door for performing opening/closing thereof in the backward and rearward direction of the vehicle.

2. Description of the Related Art

Conventionally, a vehicle which includes a turning door (swinging door) which is opened or closed in the widthwise direction thereof and a sliding door which is opened or closed in the forward and backward directions of the vehicle, and which opens or closes the doors independently, has been proposed. Such kind of related art is, for instance, disclosed in the Japanese Patent Application laid-open publication No. 2002-147090.

In a vehicle shown in the above-mentioned related art, in order to combine a swinging door with a sliding door, a first locking device is placed between the swinging door and the sliding door. The vehicle further includes a second locking device for combining the swinging door with a frame on the vehicle side and a third locking device for combining the sliding door with the frame on the vehicle side.

The first locking device connects the swinging door and the sliding door using pliers having two locking tongues. If the sliding door is closed, the first locking device is hung in a receiving seat to which the sliding door corresponds and the swinging door is combined with the sliding door so that the mechanical strength of the vehicle is improved during a side impact collision.

SUMMARY OF THE INVENTION

The vehicle includes doors, which open and close in the forward and backward directions of the vehicle and removes the center pillar that is generally installed between the front and rear doors. As a result, an entrance of the vehicle becomes so wide that an ascending and descending property or a stacking property to the vehicle can be improved. In addition, the first locking device (which becomes the door connecting mechanism) for connecting a swinging door and a sliding door is installed and the front and rear doors are connected through the first locking device so that the mechanical strength of the vehicle can be improved.

However, when the above-described configuration is applied to a sliding door system (which is referred to as a power sliding door system) for connecting the swinging door to the sliding door and electrically operating the sliding door, if the sliding door does not take into consideration whether the locking device of the swinging door, which controls the movement of the sliding door, is in lock state in which the movement of the sliding door is locked by a locking device of the swinging door, the door connecting mechanism interferes with the opening and closing of the sliding door. For example, if interference occurs, the sliding door is opened where the lock state is unstable and the sliding door is not well opened. As such, a connection between the door connecting mechanism and the sliding door is required.

It is an object of the present invention is to provide a vehicle door controlling apparatus, which in the configuration of connecting doors, when one door operates electrically, the door connecting mechanism does not interfere with the door that is operating.

In order to achieve the object, the present invention provides a vehicle door controlling apparatus, comprising: a connection locking means provided between a first door and a second door for locking the first door and the second door by connecting both of them to each other; a door-locking means for restraining opening and closing of the second door on the vehicle body to be locked; a release means for unlocking the connection locking means or the door-locking means; and a controlling means for controlling the connection locking means and the release means. The vehicle door controlling apparatus further comprises: an operating means which requests the opening of the second door; and a first lock state detecting means for detecting the state of the connection member, wherein, when a request for opening the second door using the operating means is detected, the controlling means operates the release means, releases the lock which has been locked by the connection member and releases the lock of the door-locking means, and electrically drives the second door based on a signal from the first lock state detecting means.

Other objects and further features of the present invention will be apparent from the following detailed description with the accompanying drawings.

DESCRIPTION OF THE PREFERRED EMBODIMENTS

Hereinafter, an embodiment of the present invention will be described in detail with reference to the accompanying drawings.

Figure 1:
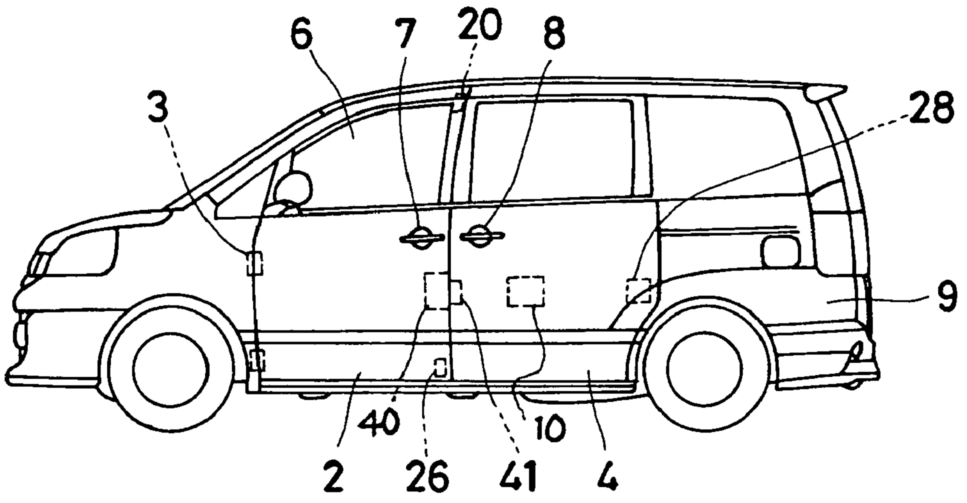
FIG. 1 is a side view of a vehicle on which a vehicle door controlling apparatus is mounted according to an embodiment of the present invention.

FIG. 1 is a side view of a vehicle on which a vehicle door controlling apparatus 1 is mounted. The vehicle has an opening 6 which an occupant ascends and descends at the side of the vehicle in its widthwise direction and the opening 6 is closed by two vehicle doors. A swinging door 2 for opening and closing the opening of the vehicle in its widthwise direction is installed at the front side of the opening 6 so as to be capable of being opened and closed with respect to a vehicle body 9. In addition, a sliding door 4 for opening and closing the opening of the vehicle in its forward and backward directions is installed at the rear side of the opening 6 so as to be capable of being opened and closed with respect to the vehicle body 9. Thus, the vehicle is configured as a center pillarless vehicle, which has no center pillar for partitioning the opening 6 between the swinging door 2 and the sliding door 4 into the front and rear sides of the vehicle. In the vehicle having the above configuration, if both the swinging door 2 and the sliding door 4 are open, the large opening 6 is formed, an ascending and descending property is improved and a stacking property is improved.

Front ends of the swinging door 2 installed at the front side of the vehicle are installed at a front pillar by a pair of upper and lower hinges 3. The swinging door 2 is horizontally swung in the widthwise direction of the vehicle about the hinges 3 and is capable of being opened and closed with respect to the front opening 6.

Meanwhile, the sliding door 4 installed at the rear side of the vehicle employs a well-known sliding mechanism in which a roller installed inside the sliding door 4 rolls along a guide rail (not shown) installed under the opening 6 between the closed and opened positions, and is moved in the forward and backward directions of the vehicle. When opened from the whole closed position, the sliding door 4 instantaneously inclines away from the rear side of the vehicle (direction of arrow S shown in FIG. 2) and then moves to the rear side of the vehicle.

A door handle 7 is installed outside the swinging door 2. The door handle 7 operates during an opening and closing operation outside the vehicle and is installed at the rear upper side of the vehicle. In addition, a connection locking mechanism 40 having a center locking function is installed inside the rear center of the swinging door 2 to connect the swinging door 2 and the sliding door 4 installed at the rear side of the vehicle. Door locking devices 20 and 26 are respectively installed in rear upward and downward directions of the swinging door 2. By inserting a vehicle key into a key cylinder (not shown) installed at the door handle 7 and by rotating, moving and operating the vehicle key, the locking devices 20 and 26 are locked or unlocked. In addition, separately from this operation, the connection locking mechanism can be mechanically unlocked, by opening the door handle 7.

Figure 6:
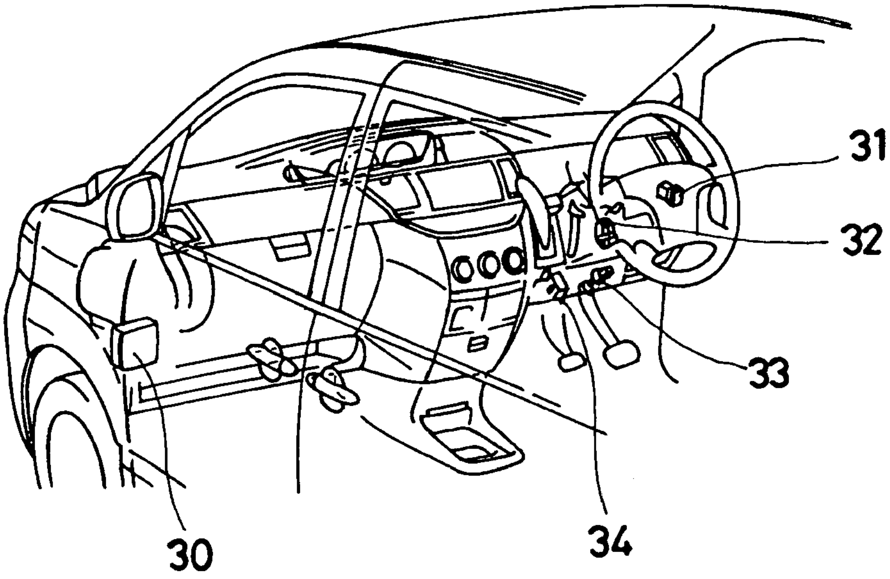
FIG. 6 is an installation view showing an installation position of a controller which controls switches around a driver's seat and the connection locking mechanism as shown in FIG. 1.

Meanwhile, the connection locking mechanism 40 is unlocked by opening the door handle 7 and is controlled by a controller 30 installed at the passenger's foot, as shown in FIG. 6. When the door locking devices 20 and 26 and the connection locking mechanism 40 are locked, even if the door handle 7 (for example, an outside handle or an inside handle) operates, the swinging door 2 is not opened. In addition, when the door locking devices 20 and 26 and the connection locking mechanism 40 are unlocked, if the door handle 7 installed at the swinging door 2 is opened, opening and closing operation of the swinging door 2 is allowed and the swinging door 2 is opened with respect to the hinges 3.

Meanwhile, a door handle 8 is installed outside the sliding door 4 in the forward and upward direction. In addition, a controller 10 is installed at the inner center of the sliding door 4. Further, a door-locking device 28 in which a latch 81 is engaged or separated from a striker (not shown) installed at the side of the vehicle is installed at the rear inside of the vehicle. The sliding door 4 is configured so that, if the controller 10 drives a sliding motor 61, the driving force is transmitted to the sliding door 4 through a power transmission mechanism 60 and the sliding door 4 operates. The door-locking device 28 installed at the rear side of the sliding door 4 can be locked or unlocked by rotating, moving and operating a vehicle key inserted into a key cylinder (not shown) installed in the door handle 8. In addition, separately from this operation, the connection locking mechanism can be mechanically unlocked by opening the door handle 8. As such, even when the door-locking device 28 of the sliding door 4 is locked, the sliding door 4 is not opened by operating the door handle 8 (for example, an outside handle or an inside handle) of the sliding door 4. However, when the door-locking device 28 is unlocked, the door handle 8 is operated to open the sliding door 4.

Control of opening and closing the sliding door 4 is performed by the controller 10, signals are input from various switches 16 in a vehicle into the controller 10, and the controller 10 operates a closing actuator 25 having the door-locking device 28 and operates a release actuator 19 in response to the input signals.

Figure 2:
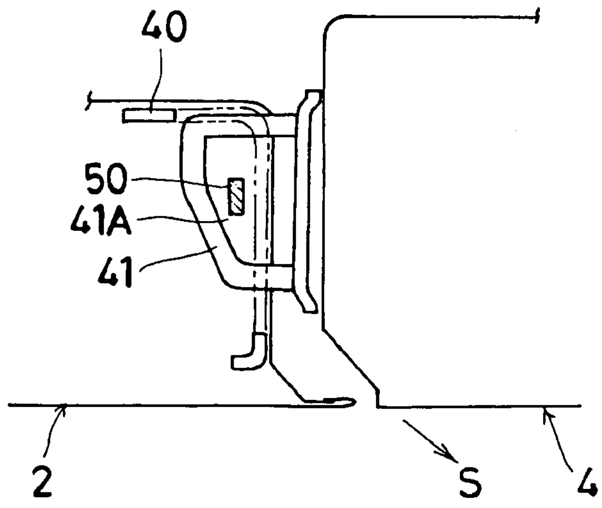
FIG. 2 is an enlarged view showing elements of a connecting part for explaining a state where a connection locking mechanism for connecting a swinging door and a sliding door as shown in FIG. 1 is connected to a striker.
Figure 3:
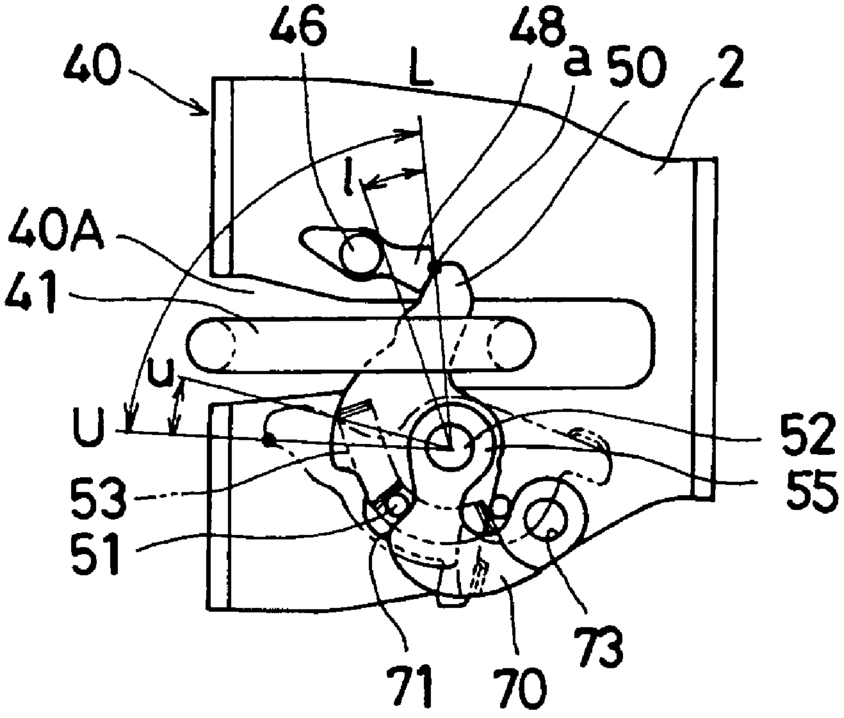
FIG. 3 is an enlarged view showing elements of a connecting part for explaining a state where the swinging door is connected to the sliding door as shown in FIG. 1.

Next, a structure for connecting the swinging door 2 and the sliding door 4 will be described. The connection locking mechanism 40 is placed at the inner center of the rear end of the swinging door 2. Meanwhile, a striker 41 having the central opening and made of a rigid body is installed in the middle of the front end of the sliding door 4, as shown in FIGS. 2 and 3. In this case, a concave portion 40A is formed in the widthwise direction of the vehicle so that the sliding door 4 does not interfere with the striker 41, installed at the side of the sliding door 4, during the opening and closing operation thereof in the widthwise direction of the vehicle.

Figure 4:
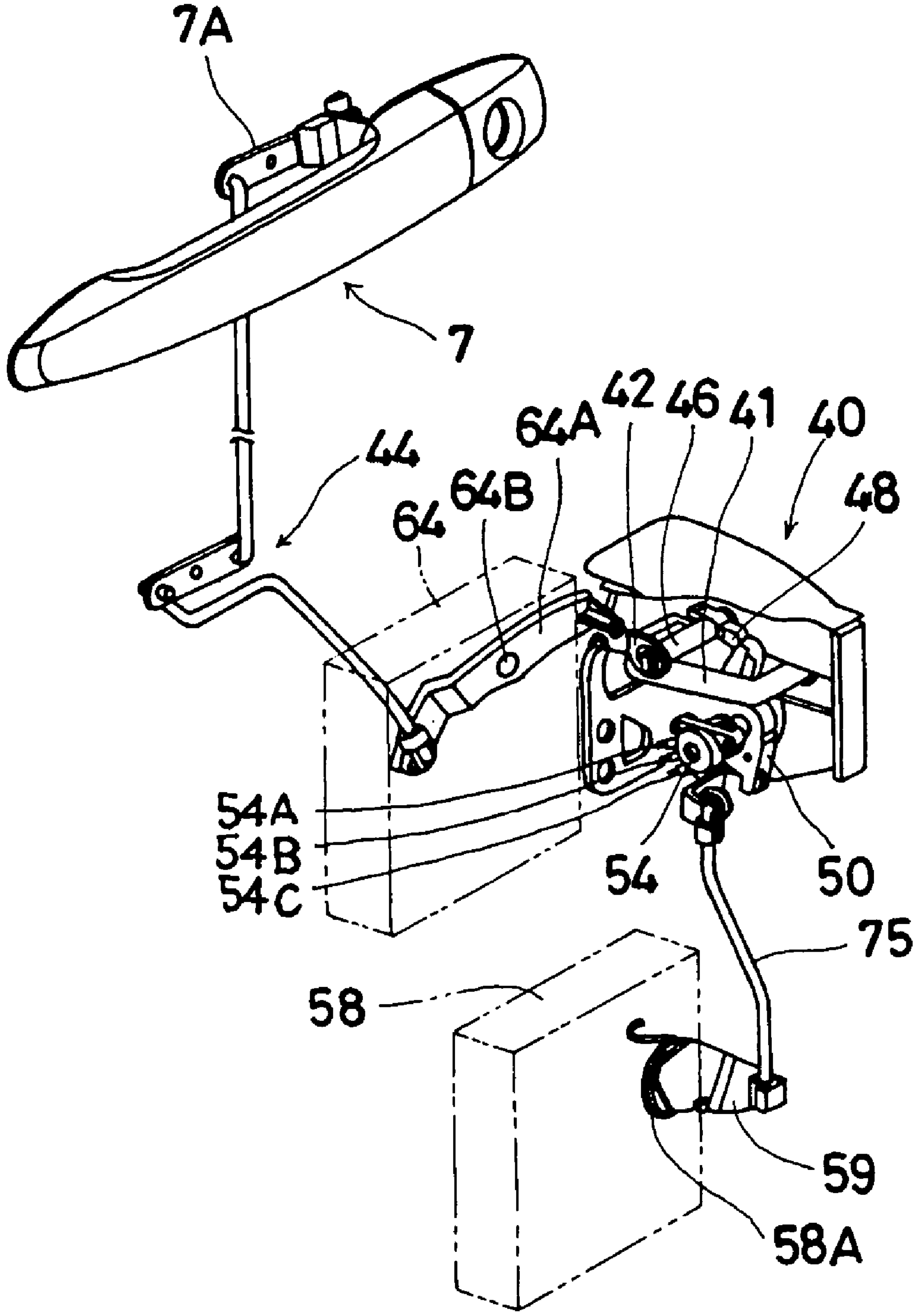
FIG. 4 is a perspective view showing a power transmission mechanism between a door handle of the swinging door and a connection locking mechanism shown in FIG. 1.

The configuration of the connection locking mechanism 40 will be described with reference to FIGS. 3 and 4. The connection locking mechanism 40 has a rotation shaft 46 installed on the rear end of the swing door 2 so as to be capable of rotating vertically. As shown in FIG. 4, a pole 48 is fixed on one end of the rotation shaft 46 and a lever 42 is integrally fixed on the other end of the rotation shaft 46. The pole 48 and the lever 42 are capable of swinging in the upward and downward directions of the vehicle.

The connection locking mechanism 40 includes a lever 50. As shown in FIG. 3, the lever 50 is supported by a pivot 52 and can rotate in the widthwise direction of the vehicle. A pin is installed at the side of the latch 50 in the same direction as the pivot 52 so that one end of a spring 53 abuts a pin 51 and the other end of the spring 53 is latched in the casing of the connection locking mechanism 40. A biasing force is applied to the latch 50 having a shape shown in FIG. 4 in the counterclockwise direction shown in FIG. 3 due to a biasing force of the spring 53.

In a state where the striker 41 fits in the concave portion 40A formed on the rear end of the swinging door 2, when the latch 50 reaches a position (L-position) which is rotated to the farthest clockwise point, as indicated by a solid line shown in FIG. 3, the pole 48 is rotated clockwise due to the biasing force of the spring 53 hung on the pole 48. As a result, the pole 48 abuts the rear side of the latch 50 in the direction of rotation and prevents reverse rotation of the latch 50. As such, as shown in FIG. 3, the latch 50 is inserted into the inner opening of the striker 41 and is held in a position where the concave portion 40A is closed, and the striker 41 is in a state (latched state) where the connection locking mechanism 40 is not released.

When the pole 48 of the connection locking mechanism 40 is latched with the latch 50, as shown in FIG. 2, a predetermined gap 41A is formed between the striker 41 and the latch 50. Due to the gap 41A, any effect on the vehicle caused by an installation error of the swinging door 2 and the sliding door 4 does not occur and the latch 50 can operate. In addition, for example, in a side collision with another vehicle, when excessive load acts on either the swinging door 2 or the sliding door 4 and deformation occurs in either or both the swinging door 2 and the sliding door 4, by the doors 2 and 4 are connected to each other by the striker 41 and the latch 50 of the connection locking mechanism 40, the strength of the door of the vehicle is secured.

The connection locking mechanism 40 further includes a release actuator 64. As shown in FIG. 4, the release actuator 64 can rotate on a driving shaft 64B, a driving lever 64A is installed in the release actuator 64, and one end of the driving lever 64A abuts an end of the lever 42 fixed to the rotation shaft 46. When the release actuator 64 is operated, the operating lever 42 is pressed and rotated counterclockwise so as to release the engagement between the pole 48 and the latch 50 so that the pole 48 at the opposite side to the operating lever 42 can be rotated counterclockwise. If the latch between the latch 50 and the pole 48 is released, due to the biasing force of the compressed spring 53 shown in FIG. 3, the latch 50 rotates and stops at a release position (U-position) where the latch 50 is rotated to the most counterclockwise direction as indicated by a double dotted line shown in FIG. 3. In this state, the concave portion 40A is opened and the striker 41 is separated from the connection locking mechanism 40 and is unlocked.

In the configuration shown in FIG. 4, when the door handle 7 of the swinging door 2 is opened, one end of the door handle 7 moves downwards and an operating lever 7A is located inside the door handle 7. A linking mechanism 44, which extends downwards, is connected to the front end of the operating lever 7A and is connected to the other end of the driving lever 64A of the release actuator 64 through the linking mechanism 44. As such, the door handle 7 is opened so that the driving lever 64A rotates and the pole 48 mechanically rotates counterclockwise. In this case, the release actuator 64 may install a clutch mechanism so as not to disturb the above-described operation by the manipulation.

In addition, a pivot (closing lever) 70 inserted through the latch 50 is installed in the connection locking mechanism 40 to pivot. As shown in FIG. 3, a shoulder 71 is formed in the closing lever 70 and the shoulder 71 abuts the pin 51 that is placed in the latch 50. Further, a hole 73 is formed in an end of the closing lever 70, a snap (connection member) formed of resin is installed in the hole 73, and one end of a link 75 is installed in the snap. Meanwhile, the other end of the link 75 is connected to a driving lever 59 which slides in the closing actuator 58 located beneath the connection locking mechanism 40.

As shown in FIG. 4, one end of a spring 58A is latched to the driving lever 59 and the other end is latched to the closing actuator 58. The link 75 is always lifted upwards due to the biasing force of the spring 58A, and the closing lever 70 is rotated counterclockwise as shown in FIG. 3 and is pressed so that the closing lever 70 is held in a position indicated by a solid line shown in FIG. 3. When the closing actuator 58 is driven, the link 75 is pulled down and the closing lever 70 rotates up to the position indicated by the solid line. In this case, as shown in FIG. 3, the closing lever 70 abuts the pin 51 at the shoulder 71 and pressing force is applied to the closing lever 70 to rotate the latch 50 clockwise so that the closing lever 70 is held in the latched position that is completely fitted in the striker 41.

The connection locking mechanism 40 includes a rotary switch 54 (first lock state detecting means). The rotary switch 54 is supported by the casing of the connection locking mechanism 40 coaxially with the latch 50 and detects the rotation (rotation position) of the latch 50. In this case, a rotation lever (not shown) is located between the latch 50 and the rotary switch 54 coaxially with the latch 50. The rotation lever, which engages the pin that is placed in the latch 50, is installed to rotate coaxially with the latch 50 and switches the state of a switch installed inside the rotary switch 54. For example, the latch 50 rotates clockwise as shown in FIG. 3, and when a reference point a of the latch 50 shown in FIG. 3 is rotated counterclockwise to a position having a predetermined angle with respect to the latched position L and reaches a predetermined position I, terminals 54A and 54B of the rotary switch 54 are electrically conducted to each other, and the rotary switch 54 outputs a latched position detecting signal. Further, it the latch 50 rotates counterclockwise as shown in FIG. 3 and reaches a predetermined position u at a predetermined angle just before a release position U where engagement with the striker 41 is released, terminals 54C and 54B of the rotary switch 54 are electrically conducted to each other and the rotary switch 54 outputs a release position detecting signal.

In this way, a predetermined gap between the latched position L and a predetermined position I near the latched position L and a predetermined gap between the release position U and the predetermined position u near the release position U are formed so that the rotary switch 54 is not affected by an installation position error of the latch 50 and detects a position which is securely latched to or released from the striker 41.

Next, a structure for electrically operating the sliding door 4 positioned at the rear side of the swinging door 2 will be described.

Figure 5:
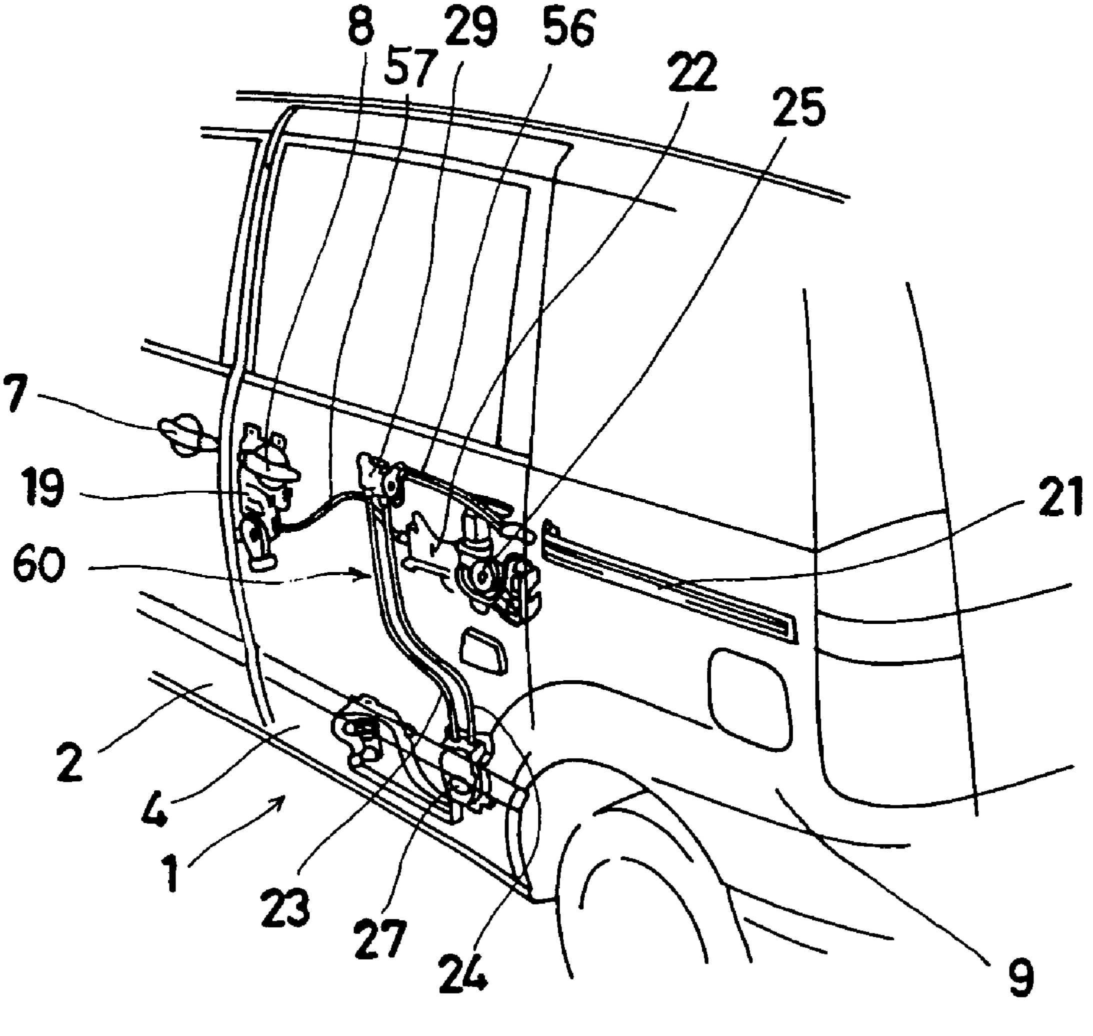
FIG. 5 is a perspective view showing a power transmission mechanism of the sliding door shown in FIG. 1.

The sliding door 4 can move along a guide rail 21 installed so as to extend in the forward and backward directions of the vehicle at the center of the vehicle body 9 in its upward and downward directions. As shown in FIG. 5, a sliding door driving unit 27 and a power transmission mechanism 60 for performing power transmission to the sliding door 4 are located inside the sliding door 4, that is, between the outer panel of the surface of the vehicle and the inner panel thereof. The power transmission mechanism 60 includes mainly the sliding door driving unit 27, an intermediate pulley 29, a remote control unit, a release actuator 22 and a closing actuator 25. In the power transmission mechanism 60, the driving force of the sliding motor 61 is transmitted to the intermediate pulley 29 disposed above the sliding motor 61 by two cables 23 and 24 (a cable in the closed direction and a cable in the opened direction). The driving force of the sliding motor 61 is transmitted to the closing actuator 25 disposed in the backward and downward directions of the sliding motor 61 from the intermediate pulley 29 by a cable 56. Meanwhile, the remote control unit is connected to a release actuator 22 by a cable 57.

Figure 7:
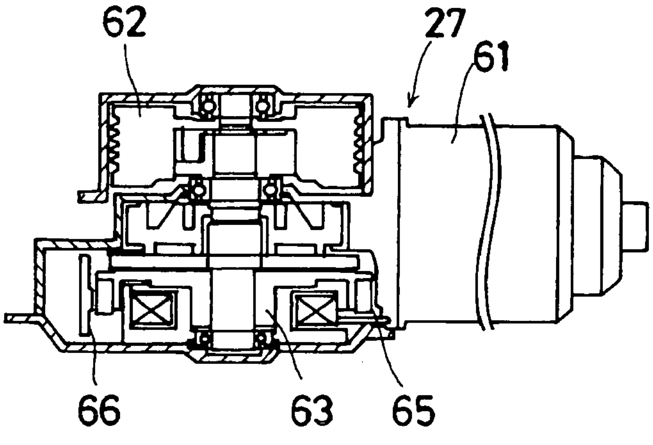
FIG. 7 is a partial sectional view showing an internal configuration of a sliding door driving unit, which drives the sliding door shown in FIG. 1.

The sliding door driving unit 27 is installed at the rear lower side of the sliding door 4. As shown in FIG. 7, the sliding door driving unit 27 includes a sliding motor 61, a drum 62 which rotates when a gear mechanism is engaged with a motor output shaft of the sliding motor 61 and when the rotation speed of the motor output shaft is reduced, and an electromagnetic clutch 63 in the course of transmission of driving force. The electromagnetic clutch 63 transmits or intercepts a driving force of the sliding motor 61 to or from the drum 62 by applying an electric current from an external power source to coils located opposite to the electromagnetic clutch 63. In addition, a 64-pole magnet 65 in which N-poles and S-poles are alternately located around a rotation body located coaxially with the rotation shaft of the drum 62 is installed in the sliding door driving unit 27, so as to detect the rotation of the drum 62. The magnet 65 is detected by a Hall element 66 fixed in the casing. As such, the rotation (forward rotation/reverse rotation) of the sliding motor 61 is detected by the output from the Hall element 66 having two elements (Hall IC) in which two signals having different phases are output and the position or speed of the sliding door 4 can be detected. The Hall element 66 performs on/off pulse output according to the rotation of the sliding motor 61, detects the rotation direction of the sliding motor 61 from the output pattern of two pulse outputs and detects the speed of the sliding door 4 and the change in the speed of the sliding door 4 based on the rotation direction of the sliding motor 61. As such, when the sliding door 4 is opened and closed, the load on the sliding door 4 is recognized and insertion and detection is possible.

Figure 8:
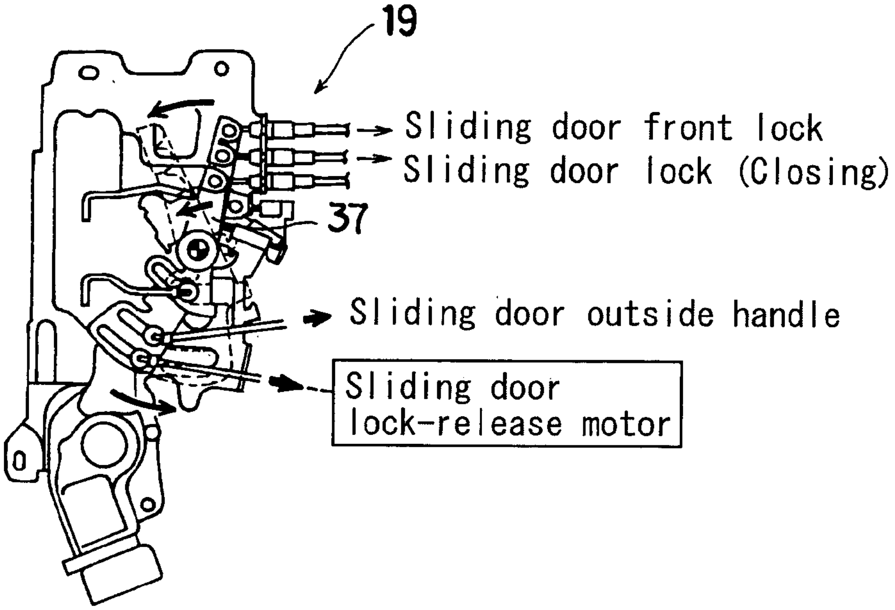
FIG. 8 shows a configuration of a release actuator, which releases a lock state of the locking mechanism of the sliding door shown in FIG. 1.
Figure 10:
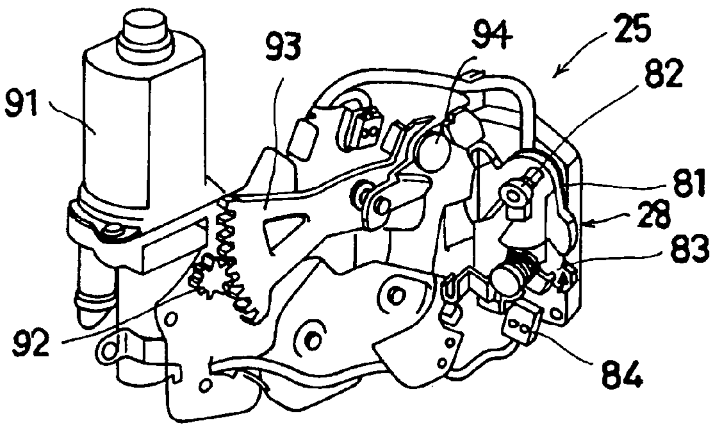
FIG. 10 is an installation view showing switches (latch switch, pole switch, etc.) of the door-locking device, which locks the sliding door shown in FIG. 1.

The release actuator 19 is disposed at the inner lower side of the door handle 8 installed at the front side of the sliding door 4. As shown in FIG. 8, the center of the operating lever 37 is pivoted with respect to the main body of the release actuator 19 and the release actuator 19 can rotate and move. A front locking device which locks the sliding door 4 in the forward direction and the closing actuator 25 having the function of locking the sliding door 4 shown in FIG. 10 are independently connected to the operating lever 37 by cables. Meanwhile, the door handle 8 which opens and closes the sliding door 4 from the outer side and a lock release motor 18 are independently connected to the other end of the operating lever 37 by cables. For example, when the door handle 8 is opened or the lock release motor 18 is driven, the operating lever 37 rotates and moves counterclockwise. If rotation and movement is performed, the operating lever 37 moves up to a position indicated by a dotted line of FIG. 8 and releases a front lock as well as the door-locking device 28 at the rear side of the sliding door 4. As such, the sliding door 4 is allowed to open.

Figure 9:
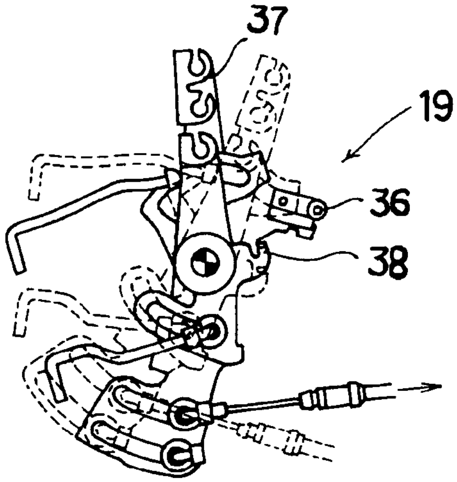
FIG. 9 is an installation view showing the release actuator of a handle switch that is operated by the door handle of the sliding door shown in FIG. 1.

Meanwhile, when opening of the door handle 8 is completed or when driving of the lock release motor 18 stops, the operating lever 37 returns to a position indicated by a solid line of FIG. 8 due to the biasing force of the spring. In this case, a handle switch 36 is installed in the main body of the release actuator 19 near the operating lever 37. As shown in FIG. 9, when the position of the operating lever 37 is in the position indicated by the dotted line of FIG. 9, the handle switch 36 is off and when the position of the operating lever 37 is in the position indicated by the solid line of FIG. 9, the handle switch 36 is pressed by an operating portion 38 protruding from the widthwise direction of the operating lever 37 and the handle switch 36 is on.

Next, the closing actuator 25 will be described with reference to FIG. 10. The closing actuator 25 has a closing function to close the sliding door 4 from a half-open state to a completely closed state. The rotation of a full lock motor 91 is transmitted to a base gear by a worm gear and the closing actuator 25 rotates a pinion gear 92. A driven gear 93 vertically meshes with the pinion gear 92, a passive lever 94 cooperates with the driven gear 93 and a latch 81 is connected to the passive lever 94. The latch 81 can be engaged with or separated from a striker (not shown) installed at the rear side of the opening 6 of the vehicle with respect to the vehicle body 9. As such, when the full lock motor 91 operates, the latch 81 rotates in cooperation with the passive lever 94, and the latch 81 fully latches from a half-latched state so that the sliding door 4 can be in the whole closed state from the half-closed state. Since the closing actuator 25 detects the position of the latch 81, a latch switch 82 (second lock state detecting means) is installed coaxially with the latch 81. The latch switch 82 includes a half-latch switch and a full latch switch, in which the switch state of the latch 81 is changed in different positions.

The half-latch switch detects the position of the latch 81 in the half-closed state. The half-latch switch changes when the position of the sliding door 4 is opened to a predetermined degree rather than the half-closed state (for example, the whole closed side: off state and the whole opened side: on state).

Figure 11:
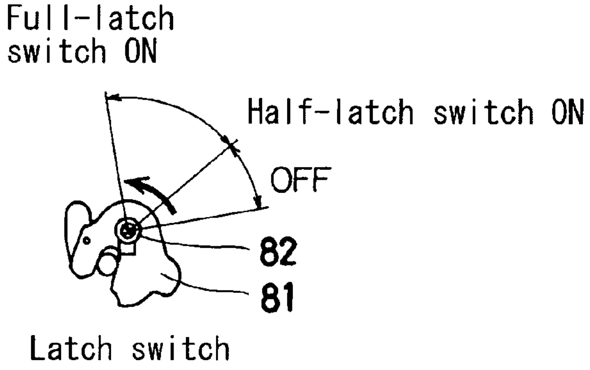
FIG. 11 illustrates the state of signals of the latch switch (full/half-latch switch) shown in FIG. 10.
Figure 12:
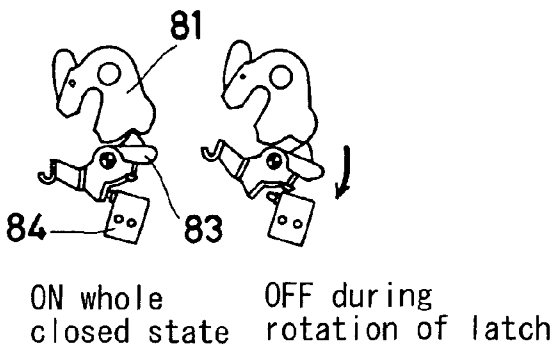
FIG. 12 illustrates the state of the pole switch shown in FIG. 10.

Meanwhile, the full latch switch detects the whole closed position of the latch 81. The full latch switch turns on just before the whole closed state from the whole opened state (for example, the whole opened side: off state and the whole closed side: on state) and the state of the latch 81 shown in FIG. 11 can be detected. Further, as shown in FIG. 12, a pole switch 84 detects the position of a pole 83, which abuts the side of the latch 81. The pole switch 84 turns on from the whole closed state and off while the latch 81 rotates.

Figure 13:
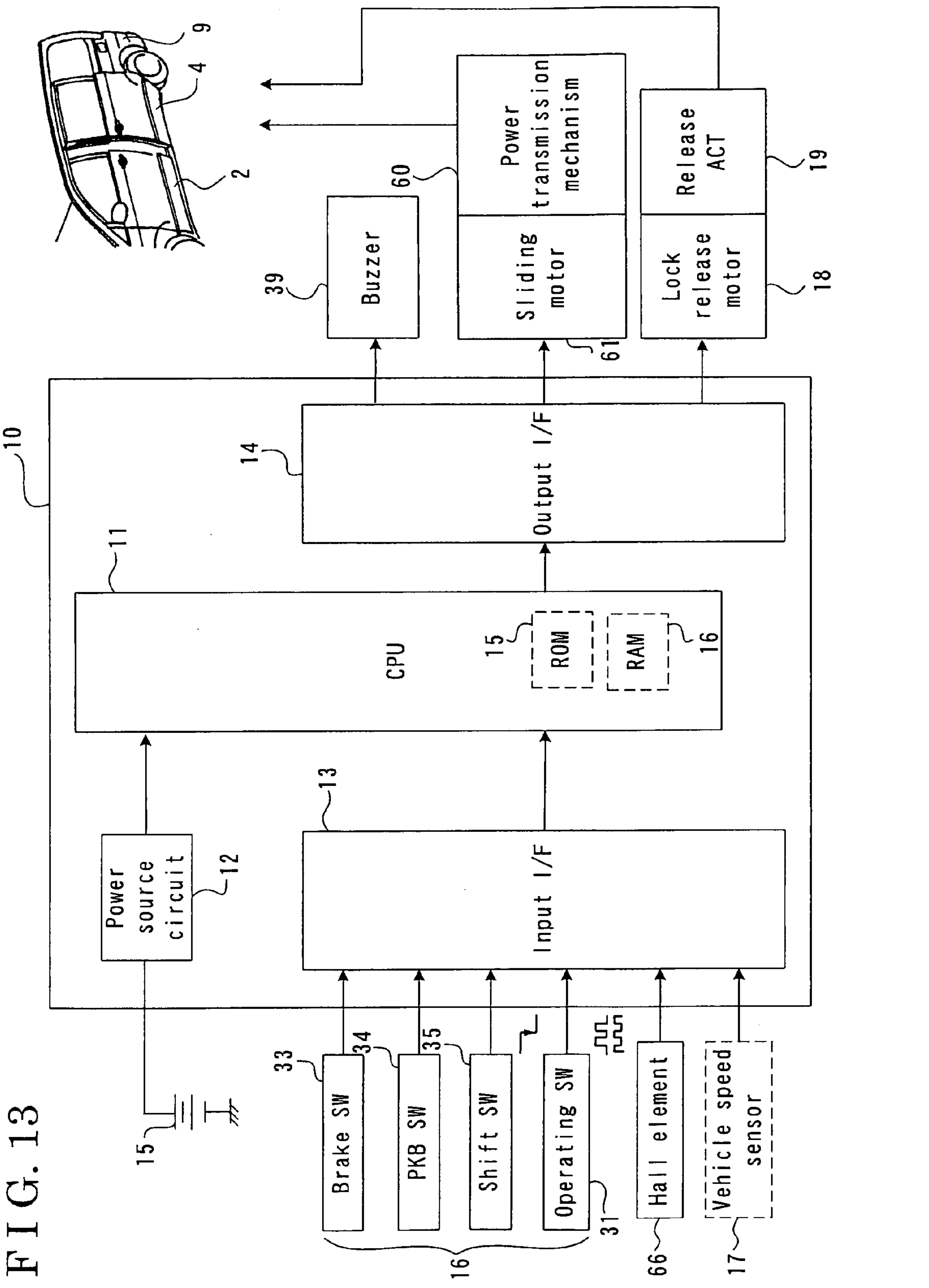
FIG. 13 shows an internal configuration and connection to an external device of the controller, which drives the sliding door shown in FIG. 1.

As described above, the power transmission mechanism 60, which electrically opens and closes the sliding door 4 using the sliding motor 61, and the release actuator 19, which releases the lock of the sliding door 4, are electrically connected to the controller 10 for controlling the sliding door 4 as shown in FIG. 13. A switch group 16 installed at the front side of a driver's seat is connected to the controller 10 and signals from the switch group 16 go to the controller 10. Signals from the switch group 16 including a brake switch 33 which turns on and off by manipulation of the brake pedal, a PKB switch 34 which detects the parking brake (PKB) state of the vehicle, a shift switch 35 which detects the state of the transmission and an operating switch 31 which is operated at an opened or closed side when request for electromotive driving of the sliding door 4 is made, or an ignition switch 32 which detects an ignition operation are input into the controller 10. In addition, a signal from the sensor is input into the controller 10 and a vehicle speed signal or a signal output from the hold element 66 is input into a vehicle speed sensor 17.

The controller 10 includes a power source circuit 12 to which power is supplied from a battery 15 and lowers a battery voltage (for example, 12V) to a predetermined voltage (for example, 5V) in the controller 10 to make the battery voltage a stable static voltage. The predetermined voltage generated by the power source circuit 12 is supplied to a CPU, etc. in the controller 10.

The controller 10 further includes an input interface 13 (input I/F) and an output interface 14 (output I/F), and signals output from the switch group 16, the Hall element 66, and the vehicle speed sensor 17 are input into a CPU 11 via the input I/F 13. the CPU 11 includes a read only memory (ROM) in which a program is stored and a random access memory (RAM) in which data is temporarily stored during operation. To drive the sliding door 2 the CPU 11 determines the state of the vehicle based on the input signals and outputs a driving signal for operating the sliding motor 61. In this case, driving instructions to the sliding motor 61 and the lock release motor 18 are performed using the output I/F 14 (for example, driver circuit). In addition, a buzer 39 is connected to the output I/F 14.

For example, when the sliding motor 61 is driven by an instruction from the CPU 11, power is transmitted to the power transmission mechanism 60 connected to an output shaft of the sliding motor 61 and the sliding door 4 is driven.

Next, control of opening and closing the sliding door 4 performed by the CPU 11 will be described with reference to a flowchart shown in FIG. 14. A processing flow of a program is shown as steps, and S indicates each of the steps.

Figure 14:
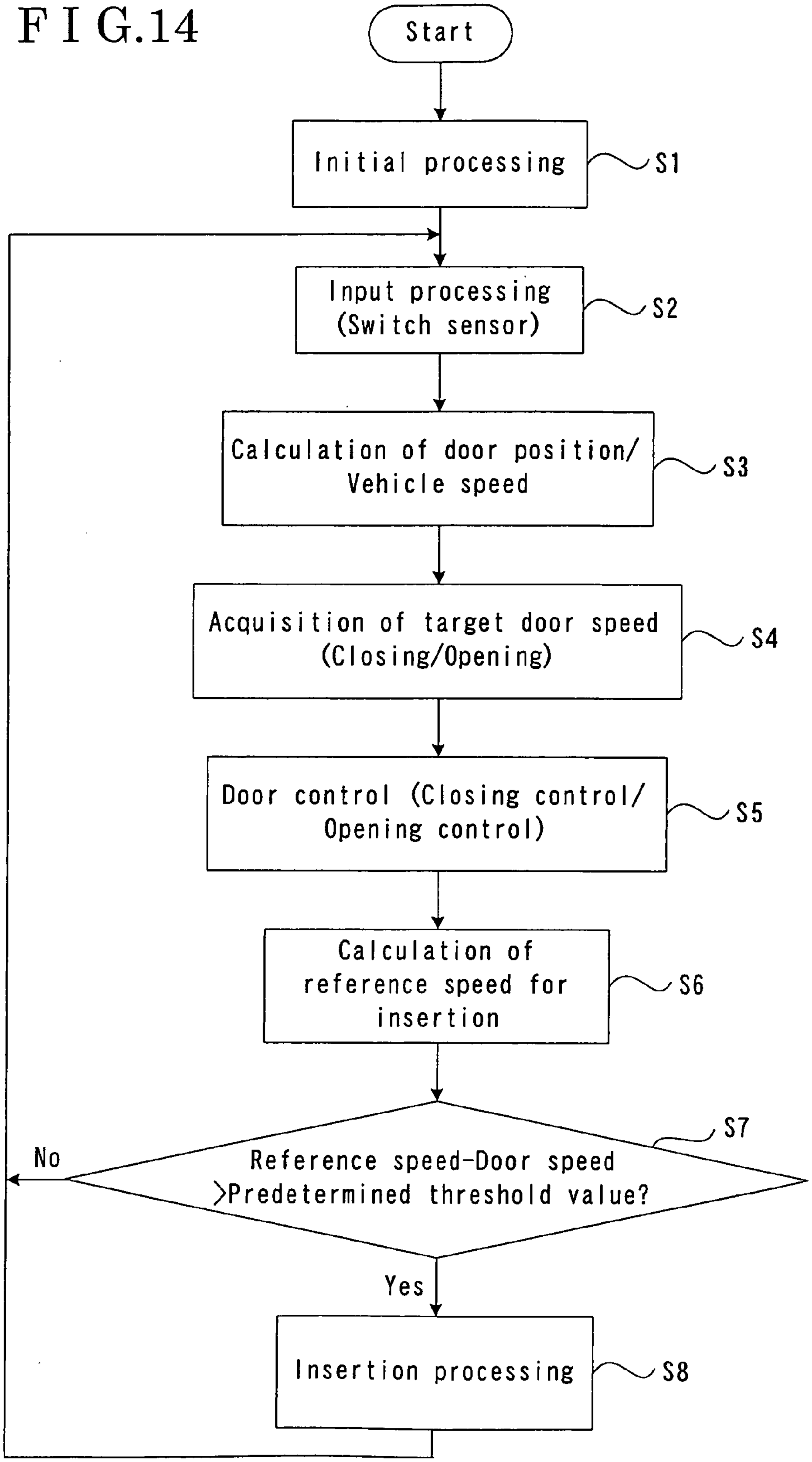
FIG. 14 is a flowchart showing control processing of the sliding door performed by a CPU shown in FIG. 13.

When power is supplied to the CPU 11 from the battery 15, the main routine processing shown in FIG. 14 is performed at every period (for example, several milliseconds). The CPU 11 performs the initial processing of step S1 at first. In the initial processing of step S1, checking the operation of ROM and RAM inside the CPU 11 is performed and after checking is completed, the initial value is input into the CPU 11 during the operation of the RAM. In this case, whether a system for operating the sliding door 4 operates normally is simultaneously checked. After the initial processing of step S1 is completed, input processing is performed in step S2. In the input processing of step S2, signal output from the switch group 16, signal output from the Hall element 66, and vehicle speed signal output from the vehicle speed sensor 17 are input into the CPU 11 via the input I/F 13 and the input state is stored in a predetermined memory. In step S3, operation on the position and speed of the sliding door 4 is performed using the state input into the predetermined memory. In this case, the CPU 11 regards the whole closed state of the sliding door 4 as a reference point (0 point) of the door position. When the sliding door 4 opens, the value of a position counter is increased and when the sliding door 4 closes, the value of the position counter is reduced so that the CPU 11 can detect the position of the sliding door 4. In addition, the speed of the sliding door 4 can be detected using a well-known method of counting pulses from the two Hall elements 66 and the position of the sliding door 4 can be detected depending on how many pulses are input into the CPU 11 within a predetermined time. In this case, since the Hall element 66 having two different phases is used, the direction of the sliding door 4 can be determined using the pulse pattern input into the CPU 11.

In step S4, the target door speed is obtained. In the present embodiment, the target door speed that is predetermined by the directions (closed direction/opened direction) and the position of the sliding door 4 is stored in the RAM. For example, the target door speed of the sliding door 4 in driving in the closed direction in an area near the whole closed position (for example, an area of several centimeters to several tens of centimeters) is set to a predetermined gradient so that even though a foreign substance is inserted into the sliding door 4 during a closing operation, load (insertion load) caused by the insertion does not exceed a predetermined load and thereafter, the target door speed is set to be constant during the whole closing. In step S5, If the target door speed is obtained, feedback control between the obtained target door speed and the calculated door speed is performed so that the sliding door 4 is controlled. The door control (opening control) will be described in detail later.

If door control is performed in step S5, the CPU 11 performs insertion and detection in steps S6 to S8. In other words, in step S6, a reference speed for determining insertion is calculated. The reference speed for insertion is detected by the Hall element 66 and the CPU 11 calculates the door speed from an output of the Hall element 66. For example, a past door speed is stored in the RAM of the CPU 11 at a predetermined number of times or predetermined period (60 msec) in time series, the door speed is filtered, and an average value of the predetermined number of times or the predetermined period of the door speed is set to a reference speed for insertion.

In step S7, a deviation between the reference speed for insertion calculated in step S6 and a current door speed is calculated. Then the deviation is compared with an insertion determination threshold value (for example, a fixed value). Here, when the deviation does not exceed the predetermined threshold value, the CPU 11 determines that the speed of the sliding door 4 is not reduced by insertion during the movement of the sliding door 4, and the program returns to step S2 and the above-described processing is repeated from step S2. However, in step S7, when the deviation between the reference speed for insertion and the current door speed exceeds the predetermined threshold value, the CPU 11 judges that insertion occurs during the movement of the sliding door 4, and that the speed of the sliding door 4 is reduced to a predetermined level with respect to the filtered reference speed, the program returns to step S2 after insertion processing is performed in step S8 and the above-described processing is repeated from steps S2 to S8. For example, when a motor is driven in the closed direction and the sliding door 4 is closed, the motor is stopped or rotated in reverse and the sliding door 4 is driven to the opening direction to a predetermined degree so that insertion, when it occurs, suppresses an increase in load and stability can be improved.

Next, door control shown in step S5 will be described. Further, in this case, when the sliding door 4 is in the whole closed state, how the sliding door 4 performs an opening operation from a state where the swinging door 2 and the sliding door 4 are connected to each other using the connection locking mechanism 40, will be described with reference to a flowchart shown in FIG. 15.

Figure 15:
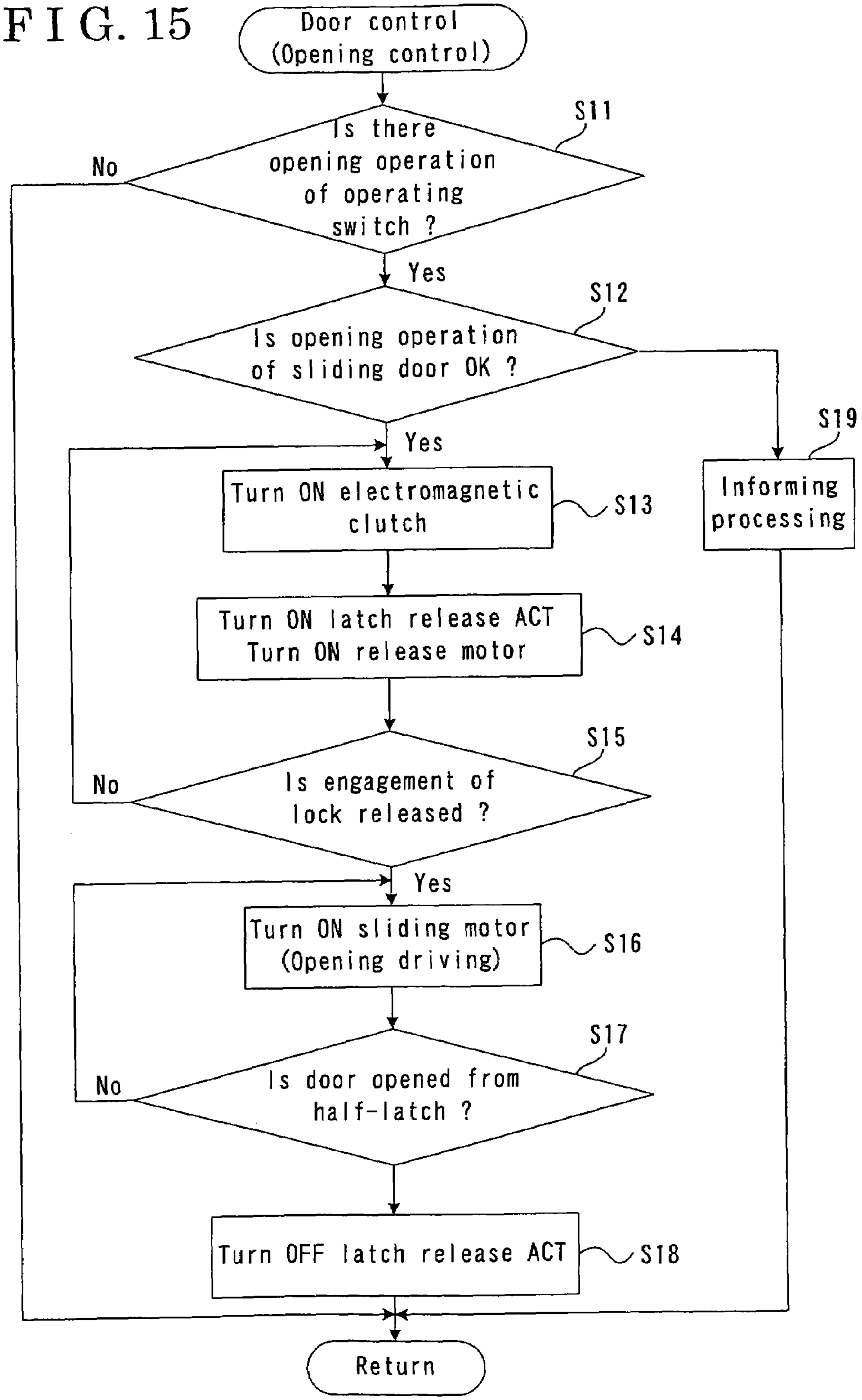
FIG. 15 is a flowchart showing door control (opening control) shown in FIG. 14.

In step S11, the CPU 11 determines whether the operating switch 31 installed at the front side of the drivers seat requires the opening of the sliding door 4. In this case, when key manipulation using a portable device (remote control) is possible, it can be detected whether a button for an opening operation of the portable device is operated. Here, when the CPU 11 does not detect the opening request of the operating switch 31, door control shown in FIG. 15 is not performed, but the CPU 11 returns to the main routine shown in FIG. 14. However, when the CPU 11 detects the opening request of the operating switch 31, it is determined whether the sliding door 4 is electrically operated and in step S12, it is determined whether the sliding door 4 performs the opening operation. The opening operation of the sliding door 4 is determined by the CPU 11 depending on whether a vehicle speed from a vehicle speed signal is less than a predetermined vehicle speed (for example, 3 Km/h) and on three conditions, that is, whether a PKB signal is on (parking brake operating state), whether the shift is in parking position and whether the brake pedal is stepped on and the brake switch is on. When the opening operation of the sliding door 4 is not possible in step S12, the program proceeds to step S19. In step S19, the CPU 11 determines whether the opening operation of the sliding door 4 is not performed, informs a driver that control of the sliding door 4 is not possible by sounding the buzzer 39 and terminates door control (opening control) processing shown in FIG. 15.

Meanwhile, if the CPU 11 determines that the opening operation of the sliding door 4 is possible, a power transmission line from the sliding motor 61 to the sliding door 4 is secured so as to electrically operate the sliding door 4. This operation is performed by applying an electric current to coils of the electromagnetic clutch 63 of the sliding door driving unit 27 and by turning on the electromagnetic clutch 63. After that the CPU 11 turns on the release motor 18, drives the release motor 18 and operates the release actuator 19, so as to release a lock at the center of the front side of the sliding door 4 of the connection locking mechanism 40 and a lock (rear lock) of the door-locking device 28 of the closing actuator 25 positioned at the rear side of the sliding door 4. As such, the lock of the rear side of the sliding door 4 is released by rotating and moving counterclockwise the operating lever 37 of the release actuator 19 as shown in FIG. 8.

In step S15, the CPU 11 determines whether the locks are released. Here, when the front and rear locks are not yet released from the sliding door 4 (when the locks are not completely released from the sliding door 4), the program returns to step S13, and the above-described processing is repeated from step S13. However, when the front and rear locks are released from the sliding door 4, processing shown in step S16 is performed. The CPU 11 determines whether the front and rear locks are released from the sliding door 4 when the full latch switch of the latch switch 82 of the door-locking device 28, that is, the off position of the sliding door 4 in the whole closed position, is changed in an area near the whole closed position as the latch 81 rotates and moves in a release direction (the off state is changed into the on state). Further, it is determined whether the contact point of the rotary switch 54 installed at the connection locking mechanism 40 reaches a position before the predetermined angle of the release position U shown in FIG. 3 and whether terminals 54C and 54B of the rotary switch 54 are electrically conducted to each other. Here, when the rear lock of the sliding door 4 is released by rotation and movement of the latch 81 of the closing actuator 25, the CPU 11 determines that the front and rear locks of the sliding door do not affect the operation of the sliding door 4 and do not interfere with the operation of the sliding door 4. In this state, the CPU 11 outputs an instruction to turn on the sliding motor 61 and starts driving of the sliding motor 61.

If driving of the sliding motor 61 starts, a driving force of the power transmission mechanism 60 is transmitted to the sliding door 4 such that the sliding door 4 opens. In step S17, the half-latch switch turned from off to on is detected at the opened side rather than a position where the full-latch switch is changed and it waits until when the half-latch switch is turned on. In step S18, an electric current is applied to the latch release actuator 10 using the timing when the half-latch switch is changed from on to off.

As such, when the sliding door 4 is opened in the whole closed state, the CPU 11 detects the opening of the sliding door 4 from the state of the operating switch 31. When the opening operation of the sliding door 4 is detected, the electromagnetic clutch 63 is turned on and the sliding door 4 can be operated electrically, After that, the latch release actuator 19 is operated, thereby releasing the front and rear locks of the sliding door 4 and it is determined from the states of the rotary switch 54 and the full-latch switch that the front and rear locks of the sliding door 4 are released completely, thereby driving the sliding motor 61.

The door position moves slightly opened, and when the state of the half-latch switch reaches nearly changing state the sliding door 4 is opened by turning off an electric current to the release actuator 19 which releases the front and rear locks. The sliding door 4 does not interfere with the connection locking mechanism 40 and the lock of the closing actuator 25 and the sliding door 4 is not dragged but can be smoothly driven.

[Advantages]

According to the present invention, in the case of electrically driving a second door, the second door can be electrically driven after restraint of a connection locking means and a door-locking means is released. Therefore, in the configuration of connecting two vehicle doors, when one vehicle door is electrically operated, the door connecting mechanism does not affect the vehicle door that is operating.

In this case, by using the first switch whose switching state is switched in a state where the second door moves from a whole closed state to an opened direction by a predetermined distance, the controlling means can securely detect the position where engagement with one of the doors caused by the connection member is released using the first switch. When the controlling means detects the switched state of the first switch, the controlling means can operate the release means to release the restraint of the second door, securely detect the locked state of the connection member and electrically drive the second door.

In addition, when the second door in the opening position is securely detected by the second switch rather than the first switch, the controlling means stops the operation of the release means so that when restraint of the second door is released, the release means is not operated more than necessary, load of a battery is suppressed and the configuration helps to make the vehicle burglarproof.

Further, the above-described configuration can be applied to a swinging door which is opened or closed in the widthwise direction of the vehicle and a sliding door which is opened or closed in the forward and backward directions of the vehicle.

What is claimed is:

1. A vehicle door controlling apparatus, comprising:

a connection locking means provided between a first door and a second door for locking the first door and the second door by connecting both of them to each other;

a door-locking means for restraining opening and closing of the second door on the vehicle body to be locked;

a release means for unlocking the connection locking means or the door locking means; and a controlling means for controlling the connection locking means and the release means, the vehicle door controlling apparatus further comprising:

an operating means which requests the opening of the second door; and a first lock state detecting means for detecting a state of the connection locking means;

wherein when a request for opening the second door using the operating means is detected, the controlling means operates the release means, releases a lock state of the connection locking means and releases a lock state of the door-locking means, and electrically drives the second door based on a signal from the first lock state detecting means.

2. The vehicle door controlling apparatus according to claim 1, further comprising a second lock state detecting means for detecting restraint of the second door on the vehicle body; wherein the second lock state detecting means includes a first switch in which, when the second door moves from a whole closed state in an opened direction by a predetermined distance, engagement with one of the doors caused by the connection member is released and the switching state of the first switch is changed, and when switching of the first switch is detected, the controlling means operates the release means, releases the lock state of the connection locking means and starts electrical driving of the second door.

3. The vehicle door controlling apparatus according to claim 2, further comprising a second switch whose state is switched to the opened direction rather than the first switch, wherein, when switching of the second switch is detected, the controlling means stops the operation of the release means.

4. The vehicle door controlling apparatus according to claim 1, wherein the first door is a swinging door which is opened or closed in the widthwise direction of the vehicle and the second door is a sliding door which is opened or closed in the forward and backward directions of the vehicle.

5. The vehicle door controlling apparatus according to claim 1, wherein the connection locking means comprises a latch that is freely rotatable in a widthwise direction of the vehicle.

6. The vehicle door controlling apparatus according to claim 1, wherein the controlling means, which electrically drives the second door, is positioned inside the second door and comprises a sliding door driving unit.

7. The vehicle door controlling apparatus according to claim 6, wherein the sliding door driving unit comprises a sliding motor, a driving force of the sliding motor being transmitted to the second door via a drum that decelerates a rotation speed of the sliding motor, and the sliding door driving unit comprising an electromagnetic clutch positioned in a transmission path of the driving force.

8. The vehicle door controlling apparatus according to claim 7, wherein the sliding motor detects, based on a phase difference of two signal outputs, a position of the second door or an opening and closing speed of the second door.

9. The vehicle door controlling apparatus according to claim 2, wherein the second lock state detecting means comprises a full latch switch by which the second door is detected to be entirely closed, and a half latch switch by which the second door is detected to be half-closed.

10. A vehicle door controlling apparatus, comprising:

connection locking means provided between a first door and a second door mounted on a vehicle body for locking the first door and the second door by connecting both of them to each other, the connection locking means comprising a rotatably mounted latch that is rotatable into an inner space of a striker to achieve an engaged condition between the latch and the striker;

door-locking means for locking the second door to restrain opening and closing of the second door on the vehicle body;

release means for unlocking the connection locking means or the door locking means;

operating means for requesting opening of the second door;

a first lock state detecting means for detecting the engaged condition between the latch and the striker, and controlling means for controlling the connection locking means and the release means so that when a request for opening the second door using the operating means is detected, the controlling means operates the release means, releases a lock state of the connection locking means and releases a lock state of the door-locking means, and electrically drives the second door based on a signal from the first lock state detecting means.

11. The vehicle door controlling apparatus according to claim 10, further comprising a second lock state detecting means for detecting restraint of the second door on the vehicle body; wherein the second lock state detecting means includes a first switch in which, when the second door moves from a whole closed state in an opened direction by a predetermined distance, engagement with one of the doors caused by the connection member is released and the switching state of the first switch is changed, and when switching of the first switch is detected, the controlling means operates the release means, releases the lock state of the connection locking means and starts electrical driving of the second door.

12. The vehicle door controlling apparatus according to claim 11, further comprising a second switch whose state is switched to the opened direction rather than the first switch, wherein, when switching of the second switch is detected, the controlling means stops the operation of the release means.

13. The vehicle door controlling apparatus according to claim 10, wherein the first door is a swinging door which is opened or closed in the widthwise direction of the vehicle and the second door is a sliding door which is opened or closed in the forward and backward directions of the vehicle.

14. The vehicle door controlling apparatus according to claim 10, wherein the latch is freely rotatable in a widthwise direction of the vehicle.

15. The vehicle door controlling apparatus according to claim 10, wherein the controlling means, which electrically drives the second door, is positioned inside the second door and comprises a sliding door driving unit.

16. The vehicle door controlling apparatus according to claim 15, wherein the sliding door driving unit comprises a sliding motor, a driving force of the sliding motor being transmitted to the second door via a drum that decelerates a rotation speed of the sliding motor, and the sliding door driving unit comprising an electromagnetic clutch positioned in a transmission path of the driving force.

17. The vehicle door controlling apparatus according to claim 16, wherein the sliding motor detects, based on a phase difference of two signal outputs, a position of the second door or an opening and closing speed of the second door.

18. The vehicle door controlling apparatus according to claim 11, wherein the second lock state detecting means comprises a full latch switch by which the second door is detected to be entirely closed, and a half latch switch by which the second door is detected to be half-closed.

* * * * *